(12) United States Patent
Horn et al.

(10) Patent No.: US 7,627,122 B1
(45) Date of Patent: Dec. 1, 2009

(54) METHOD FOR AUTHENTICATION OF A RADIO COMMUNICATIONS NETWORK WITH A MOBILE STATION, AND RADIO COMMUNICATIONS NETWORK AND A MOBILE STATION

(75) Inventors: Guenther Horn, Munich (DE); Bart Vinck, Munich (DE)

(73) Assignee: Siemens Aktiengesellschaft, Munich (DE)

(*) Notice: Subject to any disclaimer, the term of this patent is extended or adjusted under 35 U.S.C. 154(b) by 627 days.

(21) Appl. No.: 10/130,057

(22) PCT Filed: Nov. 16, 2000

(86) PCT No.: PCT/DE00/04060

§ 371 (c)(1),
(2), (4) Date: Aug. 5, 2002

(87) PCT Pub. No.: WO01/37586

PCT Pub. Date: May 25, 2001

(30) Foreign Application Priority Data

Nov. 16, 1999 (DE) .................................. 199 55 096

(51) Int. Cl.
H04L 9/00 (2006.01)
(52) U.S. Cl. ................. 380/270; 455/410; 455/411; 455/432.1; 370/331; 713/168; 709/237
(58) Field of Classification Search ................. 455/410, 455/411, 432.1; 380/30, 247, 270; 713/168, 713/169, 171; 370/331
See application file for complete search history.

(56) References Cited

U.S. PATENT DOCUMENTS

| | | | | |
|---|---|---|---|---|
| 4,897,875 A | * | 1/1990 | Pollard et al. ............... | 713/168 |
| 5,231,666 A | * | 7/1993 | Matyas ........................ | 705/75 |
| 5,239,584 A | * | 8/1993 | Hershey et al. ............... | 380/28 |
| 5,596,641 A | * | 1/1997 | Ohashi et al. ............... | 380/248 |
| 5,799,084 A | | 8/1998 | Gallagher et al. | |
| 5,805,992 A | * | 9/1998 | Schellinger .................. | 455/411 |
| 6,636,833 B1 | * | 10/2003 | Flitcroft et al. ................ | 705/1 |

(Continued)

FOREIGN PATENT DOCUMENTS

WO    WO 91/01067    1/1991

OTHER PUBLICATIONS

Chiang et al, On-Demand Multicast in Mobile Wireless Networks, IEEE, 1998.*

(Continued)

*Primary Examiner*—Nasser G Moazzami
*Assistant Examiner*—Shanto M Abedin
(74) *Attorney, Agent, or Firm*—King & Spalding L.L.P.

(57) ABSTRACT

The invention relates to a method for authenticating a radio communication network vis-à-vis a mobile station. In such a method, batches of authentication vectors that each contain an authentication token with a pertaining sequence number are generated on the network side. At the mobile station side an identity module of the mobile station decides whether a sequence number contained in a previously selected authentication vector is accepted for authentication or rejected. The identity module is informed by the radio communication network which authentication tokens with the pertaining sequence numbers are present in the same batch. One sequence number per batch is stored by the identity module and is used to decide whether the sequence number received is accepted or rejected.

6 Claims, 2 Drawing Sheets

U.S. PATENT DOCUMENTS

| | | | |
|---|---|---|---|
| 6,763,370 B1 * | 7/2004 | Schmeidler et al. | 709/203 |
| 7,131,006 B1 * | 10/2006 | Carroll | 713/171 |
| 2004/0185829 A1 * | 9/2004 | Vinck | 455/410 |

OTHER PUBLICATIONS

Patiyoot et al, Cryptographic security techniques for wireless networks, ACM, 1999.*

3G TS 33.102 V3.1.0 (Jul. 1999), Technical Specification, 3GPP, pp. 16-52.*

3GTS33.102 V3.2.0: "Technical Specification Group Services and System Aspects", 1999.*

U.S. Appl. No. 60/165,539, Carroll, C Paul, "Third Generation Wireless Communications Authentication and Key Agreement Mechanism Option", Nov. 1999, pp. 1-37.*

Chii- Hwa Lee et al, "Enhanced Privacy and Authentication for the Global System for Mobile Communications", pp. 231-243, Wireless Networks 5, 1999.*

Klaus Vedder, "GSM: Security, Services, and the SIM", pp. 224-240, Springer- Verlag Berlin Heidelberg, 1998.*

XP-002167547: "Universal Mobile Telecommunications System (UMTS)" c.1999.

3GTS33.102: "Technical Specification Group Services and System Aspects" c. 1999.

* cited by examiner

METHOD FOR AUTHENTICATION OF A RADIO COMMUNICATIONS NETWORK WITH A MOBILE STATION, AND RADIO COMMUNICATIONS NETWORK AND A MOBILE STATION

CLAIM FOR PRIORITY

This application claims priority to International Application No. PCT/DE00/04060 which was published in the German language on May 25, 2001.

TECHNICAL FIELD OF THE INVENTION

The invention relates to a method for authentication of a radio communications network with a mobile station, ad to a corresponding radio communications network.

BACKGROUND OF THE INVENTION

As is generally known, mobile stations of mobile subscribers in a radio communications network have at least one identity module (User Services Identity Module in UMTS networks or Subscriber Identity Module in GSM networks). It is also known for a number of types of security functions to be used in radio communications networks. For example, EP-0 822 727 A2 describes a method and a system for subscriber authentication and/or encryption of information, in which mobile users of a cellular digital mobile radio network on the GSM standard identity themselves to the respective network using the identity module—SIM card. Security parameters and security algorithms are in this case used for subscriber authentication between the mobile station and the mobile radio network.

Furthermore, a security function in the form of a network authentication is also possible, that is to say the radio communications network authenticates itself with the mobile station, in order to detect, and as far as possible to preclude, misuse and corruption for example by means of the "cloning" of network devices such as base stations, etc., for unauthorized monitoring of communications connections. In this context, document 3G TS 33.102 from the 3GPP (3rd Generation Partnership Project), October 1999, describes an architecture which deals with the security aspect of a radio communications network for the next generation—for example UMTS—with respect to network authentication. The known authentication method is based on the "signed-challenge" method, in which the network transmits to the mobile station 1) a "challenge" (random number RAND), 2) an information parameter in the form of a sequence number, on the basis of which the mobile station can verify that it has not previously used this information parameter, and 3) an authentication code (message authentication code MAC), which is formed at the network end from the "challenge" and the sequence number. In order to allow the authentication process to be carried out, the network must also transmit an authentication token with the "challenge". On receiving the above information (RAND, AUTN), the mobile station authenticates the source and integrity of this information by calculating an expected authentication code (XMAC) and comparing this with the value of the authentication code (MAC) contained in the authentication token which has arrived. In the situation where there are identical, the mobile station starts to check whether the received sequence number is "fresh", that is to say that it has not already been used. To do this, it assesses the history of the sequence numbers already accepted by it. Successful verification of the authentication code together with the guarantee that the received sequence number is unused lead to the network being authenticated with the subscriber. With this method, the "challenge" must never be repeated in order to reliably avoid misuse and the like.

A number of stacks (batches) of authentication vectors are normally produced at the network end, each containing the authentication token with the sequence number. For each new authentication from the respective stack, an unused authentication vector is selected, and at least the sequence number is transmitted in an authentication request to the mobile station. A decision is then made by the identity module at the mobile station end as to whether the received sequence number will be accepted or rejected for authentication, and the identity module then responds to the authentication request.

In order to guarantee to the identity module that the sequence number has actually been "freshly" allocated, the network has only sequence numbers which are always greater than the last transmitted number. The identity module then just needs a single counter, whose current count is in each case identical to the value of the last accepted sequence number. A new sequence number is accepted only provided it is greater than the current count. Nevertheless, it is possible in this case for the sequence of transmitted numbers not to match the sequence of received numbers, for example if the mobile subscriber has moved with his subscriber station between a number of networks and wishes to register with different network devices. If the identity module were to store only a single value, sequence numbers would be rejected if they were used out of sequence—which in principle is not forbidden and not when they are repeated—a situation which must undoubtedly be avoided.

One theoretical method for reliable identification of repetition of sequence numbers is for the identity module to store all the already received numbers. Since, on the one hand, the number of numbers is in principle unlimited and, on the other hand, the storage capacity of the identity module is limited, this method has only a short life. A better method uses a list with the L largest sequence numbers which it has already received and accepted. When the mobile station receives a sequence number, it accepts that in its identity module only if it has not yet been stored and is greater than the smallest number in the list. This procedure allows sequence numbers to be used on an individual basis which have been transmitted outside the sequence to the mobile station and which are in each case less than the greatest number and the smallest list entry. In addition to considerable amount of memory, this also requires complicated management of an organized list, in which case, in particular, explicit management commands must be defined and executed in order to manage this list.

SUMMARY OF THE INVENTION

The present invention discloses a method for network authentication which is as effective and economic as possible, as well as a corresponding radio communications network and a corresponding mobile station.

In one embodiment of the invention, there is a method comprising the identity module is informed by the radio communications network as to which authentication tokens with an associated sequence number are located in one and the same stack (BA), and at least one sequence number is stored for each stack by the identity module and is used for the decision on acceptance or rejection of the received sequence number.

Some advantages of the invention include the reduction in the requirements for the amount of memory in the identity module, the simplification of the verification by the identity module required for acceptance of the sequence number, and the lack of explicit management commands for list administration.

In on aspect of the invention, the identity module is provided with information about the way in which the sequence numbers and the authentication tokens for each stack are generated at the network end, and thus, stores preferably a single sequence number for each stack—preferably the highest sequence number from the respective stack—and no longer needs to store all of the sequence numbers. The reduction in the amount of memory in the module is significant and is approximately in the same order of magnitude as the mean stack size. The simplified management (in comparison to the known method) of the number list, which is reduced to a minimum, is likewise ensured since, at the mobile station end, the verification as to whether the list already includes a number that has arrived, and the updating of the list on acceptance of this number, are avoided.

Another advantageous feature of the method according to the invention is that the additional information as to which sequence numbers are located in one and the same stack means that the network does not require any details about the current location of the mobile subscriber with his or her mobile station, provided it produces appropriate sequence numbers in the authentication tokens. The subscriber can thus move freely (roaming) between a number of networks without—as in the case of the known method—any risk of rejection of new sequence numbers on the basis of a change to the numerical sequence—resulting from the mobility—even though these new numbers have not yet been rejected at all and would thus actually be usable.

In another embodiment of the invention, a network device in the radio communications network in each case allocates a mode parameter for the authentication tokens, and this mode parameter has an identical value for the authentication tokens in the same stack, that the mode parameter and the sequence number of the selected authentication token are sent to the identity module and that the identity module accepts the received sequence provided it is greater than the stored sequence number which corresponds to the received mode parameter.

The use of a single mode parameter for each stack, which provides that the sequence numbers in the same stack are identical, makes it unnecessary to store the large number of sequence numbers in a list in the identity module, and makes the network authentication process particularly effective with regard to the necessary effort for generating and managing this mode parameter. Instead of having to store a long list of sequence numbers, a considerably smaller numerical field is sufficient. The identical mode parameter forms the information for the identity module as to how the sequence numbers associated with one and the same stack are generated at the network end.

In still another embodiment of the invention, it is advantageous for a numerical value for each mode parameter to be stored by the identity module, for the decision on acceptance or rejection of the received sequence number. This is an economical and effective method for making the decision at the mobile station end quickly and with the minimum possible complexity.

The mode parameters are preferably allocated to the stacks on a circulating basis. That is, independently of whether these can be allocated for new authentication processes in one and the same network or in different networks. Owing to the circular allocation of the mode parameters, the network device does not need to store any information about the location of the mobile station with which the authentication process is being carried out, nor does it need to maintain any such information.

In yet another embodiment of the invention, a network device in the radio communications network allocates a number of mode parameters for the authentication tokens, which mode parameters have different values for authentication tokens in the same stack and which are each located in the same sequence as the authentication tokens within an individual stack, and the authentication tokens in the stack are allocated the same sequence number. Different mode parameters form the information for the identity module as to how the sequence numbers associated with one and the same stack are generated at the network end. This likewise results in a reduction in the amount of memory in the identity module.

In one aspect of the invention, a list whose entries each have a sequence number and a mode parameter is stored by the identity module in order to decide on acceptance or rejection of the received sequence number.

In another aspect of the invention, the received sequence number can be accepted with simple means at the mobile station end provided it does not appear in the list and is greater than the smallest stored sequence number and/or provided it appears in the list and the received mode parameter is greater than the mode parameter that is stored with the entered sequence number.

According to still another embodiment of the invention, at least one specific mode parameter is reserved, and is allocated when an urgent request for an individual authentication vector occurs. This results in normal mode parameters and specific mode parameters being available, which can be allocated on a flexible basis depending on the current status on the network device—whether it is in a non-urgent state or in an urgent state.

It is preferable if the network device in the radio communications network allocates the mode parameters such that the stacks of authentication vectors stored by different network devices have different mode parameters. This ensures that, for the majority of the time, the network devices have different mode parameters for different stacks, thus reliably avoiding repetition (replay) of the "challenge" with the authentication token and with the sequence number contained in it.

BRIEF DESCRIPTION OF THE DRAWINGS

The invention will be explained in more detail using exemplary embodiments which are illustrated in the figures, in which.

DETAILED DESCRIPTION OF THE PREFERRED EMBODIMENTS

Figure 1:
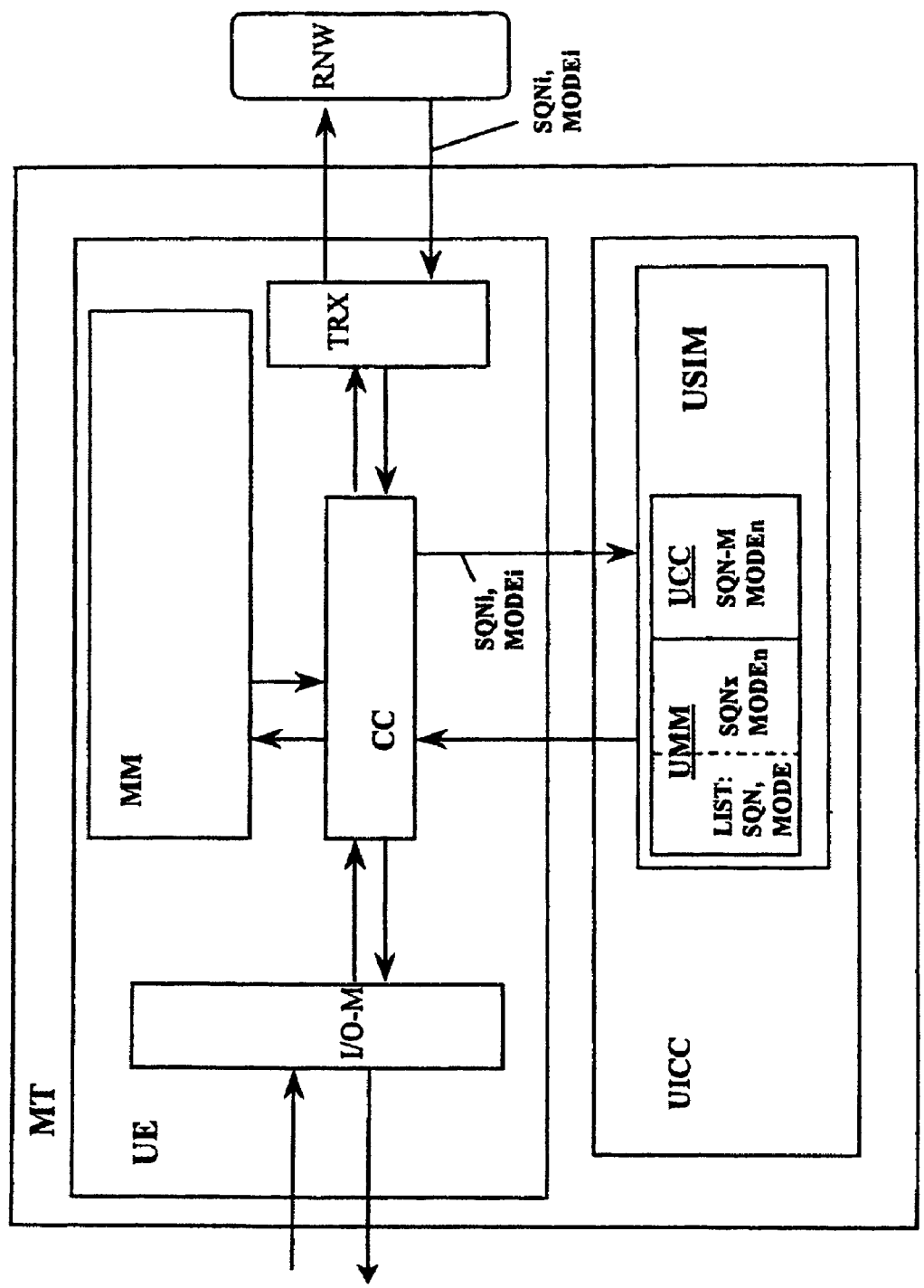
FIG. 1 shows a block diagram of a mobile station with an identity module.

FIG. 1 uses a block diagram to show the basic design of a mobile station MT which has user equipment UE and a UMTS Identity Chip Card (UICC) with an identity module USIM (UMTS Services Identity Module). The example relates to the use of the mobile station MT in a future UMTS (Universal Mobile Telecommunication System) radio communications network, although it could likewise be used for other radio communications networks. As is known, a mobile subscriber uses the mobile station for communication with other subscribers in communications networks, or with their network devices. The information is interchanged via a radio interface on communication connections between the mobile station MT and network devices in a radio communications network RNW—see also FIG. 2—in both transmission directions.

For transmission and reception of radio signals which may contain speech, data etc., the user equipment UE has a transmitting/receiving device TRX, which is connected to a central control device CC. The central control device CC is furthermore connected to a memory device MM and to an input/output module I/O-M. The input/output module I/O-M forms an interface to the user—for example a mobile subscriber SUB—in order, in the present example, to receive in particular the inputs from the subscriber, who is normally the user of the mobile station. The user equipment UE is connected to the identity module USIM via a user equipment chip card interface. The mobile subscriber of the cellular digital mobile radio network can identify himself with the respective network in which he is registered using the identity module USIM. The identity module USIM stores subscriber-related data and authentication data, for which purpose it has a local control device UCC and a local memory device UMM, which are connected to the transmitting/receiving device TRX either directly or via the central control device CC.

Figure 2:
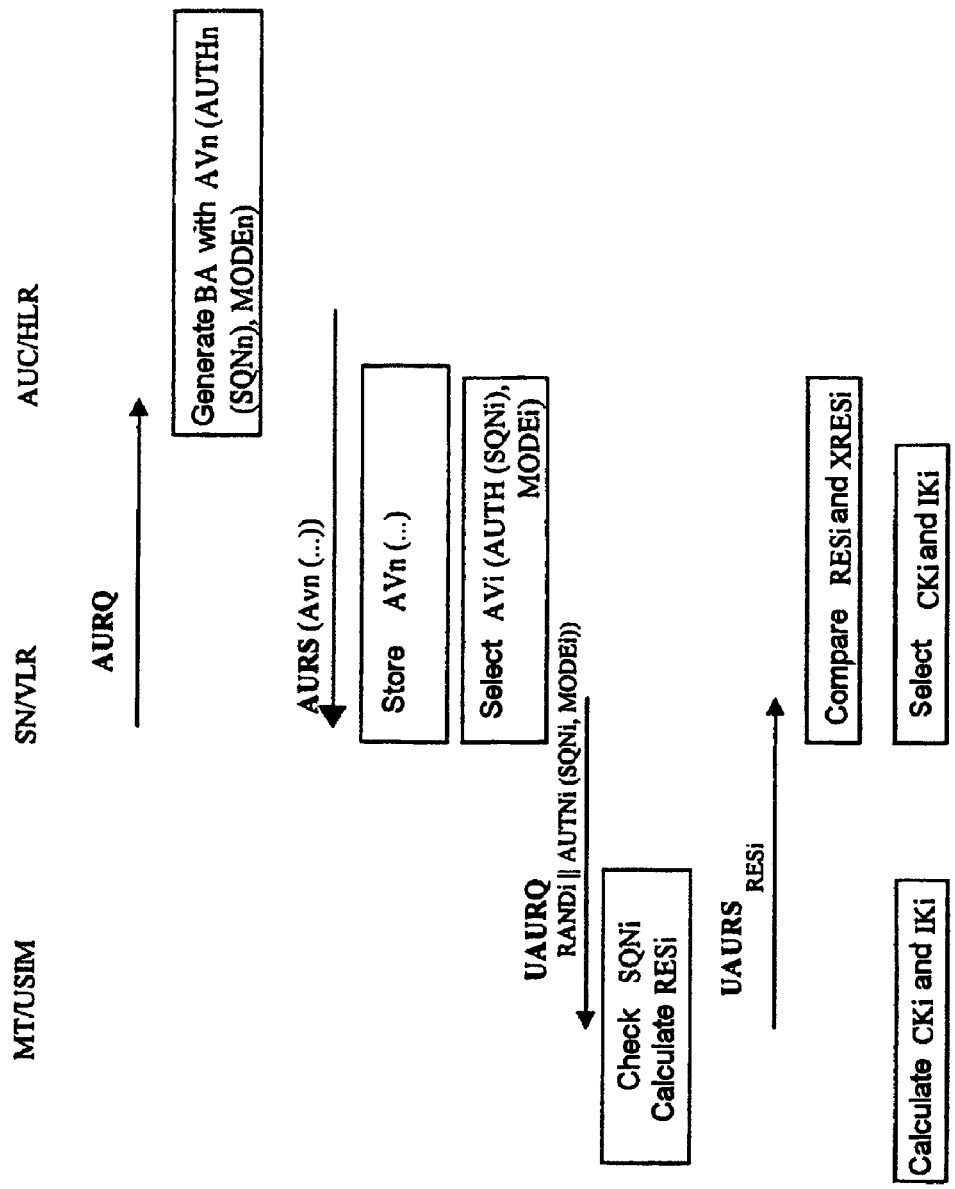
FIG. 2 shows a message flow between the identity module and the network devices for network authentication.

For authentication of the ratio communications network RNW and its devices with the mobile station MT, or with its identity module USIM, messages are transmitted with information, of which the signals and parameters which are relevant to the invention and its refinements are explained in FIG. 2. The network authentication process is carried out using the known "signed challenge" protocol, which is combined with network-end generation and allocation as well as mobile-station-end storage of sequence numbers. As soon as the network (serving network) which serves the mobile subscriber or his mobile station MT or one of its network devices requests authentication data within the network, for example for updating of the location of the subscriber (location update), a network device—the authentication device (AUC)—generates a number of authentication vectors (quintets). If the available authentication vectors have been used up, the network device generates new vectors. A specific number of authentication vectors—for example five—are preferably in each case combined to form a stack (batch). Each authentication vector (AV) includes a random number (RAND), a response parameter (XRES), a cypher key (CK), an integrity key (IK) and an authentication token (AUTN). Each authentication token (AUTN) contains a sequence number (SQN), an authentication code (MAC) and, according to the subject matter of the invention, additional information which preferably includes a mode parameter (MODE). The sequence numbers in the authentication tokens (AUTN) or authentication vectors are produced in an ascending or descending sequence.

For each new authentication, the network device in the network RNW which has initiated the network authentication process chooses an unused authentication vector from the respective stack. After this, it sends the authentication token, which contains the sequence number $SQN_i$ and the mode parameter $MODE_i$, of the chosen authentication vector together with the random number in an authentication request via the radio interface to the mobile station MT. In this case, according to the subject matter of the invention, the mode parameter $MODE_i$ identifies which sequence numbers are located in one and the same stack. The mode parameter $MODE_i$, which has different values for different stacks, is identical for all the authentication tokens in the same stack. At the mobile station end, the identity module USIM decides whether the received sequence number $SQN_i$ should be accepted or rejected for authentication, and then responds to the authentication request from the network device by transmitting an appropriate message via the radio interface to the network RNW. According to the subject matter of the invention, the identity module USIM stores in its memory device UMM a sequence number $SQN_x$ for each mode parameter $MODE_n$—preferably the highest sequence number in the respective stack—and this is then used for the detection on acceptance or rejection of the received sequence number $SQN_i$. The memory device UMM thus preferably includes a single entry $SQN_x$ for each of the mode parameters $MODE_n$, thus representing a minimal amount of memory in comparison to the management of numerical lists of all the sequence numbers in the known methods.

An alternative embodiment, relating to how the information on which authentication tokens are associated with the same stack is transmitted to the identity Module USIM, provides for the network device in the radio communications network to allocate a number of mode parameters MODE, which have different values for the authentication tokens in the same stack. In this case, they are in each case located in the same sequence as the authentication tokens within an individual stack. The authentication tokens in the stack are then allocated the same sequence number SQN. The memory device UMM in the identity module USIM has a list LIST whose entries each include the sequence number SQN and the mode parameter MODE, in order to decide on acceptance or rejection of the received sequence number $SQN_i$. As soon as the identity module USIM receives an authentication token with the sequence number $SQN_i$ and a mode parameter $MODE_i$, it accepts the sequence number provided this does not appear in the list LIST of numbers and is greater than the smallest stored sequence number SQN. The received sequence number $SQN_i$ is also accepted provided it appears in the list LIST of numbers and the mode parameter $MODE_i$ contained in the authentication token is greater than the mode parameter MODE stored with the sequence number SQN which has been entered. The list LIST in the memory device UMM is, finally, updated by the control device UCC in the identity module USIM on acceptance of the received sequence number $SQN_i$.

The local control device UCC for the identity module USIM has a number of numerical values SQN-MS which are respectively defined for each mode parameter $MODE_n$ and can be used to decide on acceptance or rejection of the received sequence number $SQN_i$. If, by way of example, there are a total of M available mode parameters $MODE_n$, they can in each case be allocated to the stacks and to the authentication vectors and authentication tokens in one and the same stack such that the current stack is given the value m<M, the next stack is given the value m+1, etc. If the current stack is assigned the value M, the next stack has the value m=1. The mode parameter $MODE_n$ comprises, for example, one byte, which may be attached to the respective sequence number or may be transmitted separated from it, but at the same time as it. This circulating allocation of mode parameters $MODE_n$ is carried out irrespective of whether they are to be generated for new authentication processes in one and the same network or in different networks. As a result of the circular allocation of the mode parameters, the network device does not need to store any information about the location of the mobile station with which the network is being authenticated, nor does it need to maintain such information. At least one specific mode parameter—for example the value m=0—can preferably be reserved, and can be allocated when an urgent request for an individual authentication vector occurs at the network end. In the present examples, normal mode parameters 1 ... M and an individual specific mode parameter 0 are available, which can be produced and allocated on a flexible basis depending on the current status of the network device—whether it is in a non-urgent state or in an urgent state.

The message flow between the identity module USIM in the mobile station MT and the network devices SN/VLR and AUC/HLR for the network authentication is shown in FIG. 2, with the example relating primarily to the preferred variant with a mode parameter which is identical for the authentication tokens which are located in the same stack. SN (Serving Network) denotes the radio communications network which is serving the mobile station MT on the basis of its location, the network devices VLR (Visitor Location Register) and HLR (Home Location Register) are, for example, the subscriber data registers which are already known from the GSM network for the storage of data—for example subscriber data, service date etc.—while AUC (Authentication Center) is the authentication device of the network end—as the device which interacts from the opposite end with the identity module USIM at the terminal end—controlling the measures and functions required for the authentication process.

The network device VLR initiates the authentication process—for example after a location update for the mobile station MT which has moved into the responsibility area of a new region and therefore registers there—and thus requests authentication data in a message AURQ (Authentication Data Request) from the network device AUC for the mobile subscriber whose basic data is made available by the network device HLR. The authentication device AUC generates a stack BA of n authentication vectors AVn (quintet)—for example n=5—including authentication tokens AUTn with associated sequence numbers SQNn and the mode parameter MODEn, which is identical for the authentication tokens AUTNn in this stack BA. The authentication device AUC responds to the arrival of the message AURQ with a message AURS (Authentication Data Response), which includes the parameters AVn with SQNn and MODEn. The network device VLR stores the received authentication tokens AUTNn with the associated sequence numbers SQNn and the mode parameters MODEn and, for the new authentication process, chooses from the stack an unused authentication vector AVi with the corresponding sequence number SQNi and the corresponding mode parameter MODEi. The network device VLR links the chosen sequence number SQNi and the mode parameter MODUSn to the random number RAND in a message UAURQ (User Authentication Request) which is sent as an authentication request to the mobile station MT, or to its identity module USIM via the radio interface.

The identity module USIM checks the arriving sequence number SQNi taking account of the mode parameter MODEn sent at the same time to determine whether it can be accepted, that is to say whether there is any misuse—for example resulting from cloning of a network device—or whether a data error has occurred by repeated use (replay) of a sequence number which has already been used previously—see the description relating to FIG. 1. If the received sequence number SQNi is not rejected, the individual response parameter RESi which is applicable to this authentication process can be calculated by the identity module USIM and can be sent in a message UAURS (User Authentication Response) to the network device VLR. Furthermore, the identity module USIM also calculates the individual cypher key CKi and the individual integration key IKi, both of which apply to the mobile station MT. The network device VLR then compares the arriving response parameter RESi with its own response parameter XRESI stored in the authentication vector AVi and, if the two parameters match, considers that the authentication procedure has been carried out successfully. Furthermore, it chooses the cypher key Cki, which is stored in the authentication vector AVi, and the integrity key IKi, for the network end. These keys Cki and Iki are then made available both by the identity module USIM and by the network device VLR to those units which will carry out the cypher function and integrity function in the terminal and in the network, respectively.

Assuming that the deterministic size of a stack BA of authentication vectors is b, then the M mode counters for the mode parameters ensure that none of the (M−1)×b authentication vectors which are generated on the basis of a marked authentication vector can cause rejection of the marked authentication vector. This means that each of the (M−1)×b authentication vectors which is produced on the basis of the marked authentication vector can be received by the identity module USIM, while at the same time guaranteeing that the marked authentication vector will be accepted. If the known method were to be applied to a list of the highest sequence numbers managed in the identity module USIM, the list would comprise (M−1)×b entries. If, on the other hand, the method of multiple allocation of mode parameters is applied to the authentication tokens or to the stacks, and of the storage of a single sequence number for each of the stacks, then this results in the amount of memory in the identity module USIM being reduced by the amount b×(M−1)/M−b. Since the implementation at the terminal end in particular is normally based on a chip unit, the amount of memory is of essential importance there, so that the memory reduction achieved by the invention represents a major advantage over known methods. Further advantages of the features according to the invention include firstly, at the mobile station end, the avoidance of the production, maintenance and updating of an organized list of numbers in the identity module, and secondly, at the network end, the simple management of an up-to-date number of mode parameters by means of the authentication device itself, without any separate management message being required for this purpose.

What is claimed is:

1. A method for authentication of a radio communications network with a mobile station having an identity module, comprising:

producing stacks of authentication vectors at the network end, each authentication vector including an authentication token with a sequence number and a mode parameter, wherein unique mode parameters are allocated to each stack such that the mode parameter has an identical value for all authentication tokens in the same stack;

selecting an unused authentication vector from the respective stack for each new authentication;

sending an authentication token, sequence number, and mode parameter of the selected unused authentication vector to the mobile station; and determining at the mobile station end by the identity module whether the received sequence number is accepted or rejected for the authentication, wherein the identity module is informed by the radio communications network as to which authentication tokens with an associated sequence number are located in the same stack, and wherein at least one sequence number is stored for each stack by the identity module, wherein the identity module accepts the received sequence number if it is greater than the at least one stored sequence number which corresponds to the received mode parameter, and wherein a numerical value, representative of acceptance or rejection of the received sequence number, is stored by the identity module for each mode parameter.

2. The method as claimed in claim 1, wherein the network device in the radio communications network allocates the mode parameters such that the stacks of authentication vectors which are stored by different network devices have different mode parameters.

3. The method as claimed in claim 1, wherein the mode parameters are allocated to the stacks on a circulating basis.

4. A method for authentication of a radio communications network with a mobile station having an identity module, comprising:

producing stacks of authentication vectors at the network end, each authentication vector including an authentication token with a sequence number and a mode parameter, wherein unique mode parameters are allocated to each stack such that the mode parameter has an identical value for all authentication tokens in the same stack, and wherein the mode parameters are allocated to the stacks on a circulating basis;

selecting an unused authentication vector from the respective stack for each new authentication;

sending an authentication token, sequence number, and mode parameter of the selected unused authentication vector to the mobile station; and determining at the mobile station end by the identity module whether the received sequence number is accepted or rejected for the authentication, wherein the identity module is informed by the radio communications network as to which authentication tokens with an associated sequence number are located in the same stack, and wherein at least one sequence number is stored for each stack by the identity module, and wherein the identity module accepts the received sequence number if it is greater than the at least one stored sequence number which corresponds to the received mode parameter.

5. A method for authentication of a radio communications network with a mobile station having an identity module, comprising:

producing stacks of authentication vectors at the network end, each authentication vector including an authentication token with a sequence number and a mode parameter, wherein unique mode parameters are allocated to each stack such that the mode parameter has an identical value for all authentication tokens in the same stack, and wherein at least one specific mode parameter is reserved, and is allocated when an urgent request for an individual authentication vector occurs;

selecting an unused authentication vector from the respective stack for each new authentication;

sending an authentication token, sequence number, and mode parameter of the selected unused authentication vector to the mobile station; and determining at the mobile station end by the identity module whether the received sequence number is accepted or rejected for the authentication, wherein the identity module is informed by the radio communications network as to which authentication tokens with an associated sequence number are located in the same stack, and wherein at least one sequence number is stored for each stack by the identity module, and wherein the identity module accepts the received sequence number if it is greater than the at least one stored sequence number which corresponds to the received mode parameter.

6. A method for authentication of a radio communications network with a mobile station having an identity module, comprising:

producing multiple stacks of multiple authentication vectors at the network end, each authentication vector including an authentication token with a sequence number;

allocating a different mode parameter value to each of the multiple stacks such that each stack has a unique mode parameter value, such that the multiple authentication tokens in each stack correspond to the same mode parameter value;

selecting an unused authentication vector from a particular one of the multiple stacks for a new authentication, the particular stack having a particular mode parameter value allocated thereto;

sending an authentication token, sequence number, and the particular mode parameter value of the selected unused authentication vector to the mobile station;

storing at the mobile station end a reference sequence number corresponding to each mode parameter value; and determining at the mobile station end by the identity module whether the received sequence number is accepted or rejected for the authentication, including:

identifying the particular mode parameter from the received authentication vector;

identifying the reference sequence number corresponding to the particular mode parameter value;

comparing the received sequence number to the reference sequence number corresponding to the particular mode parameter value; and accepting the received sequence number if it is greater than the reference sequence number corresponding to the particular mode parameter value.

\* \* \* \* \*